Patented Sept. 21, 1943

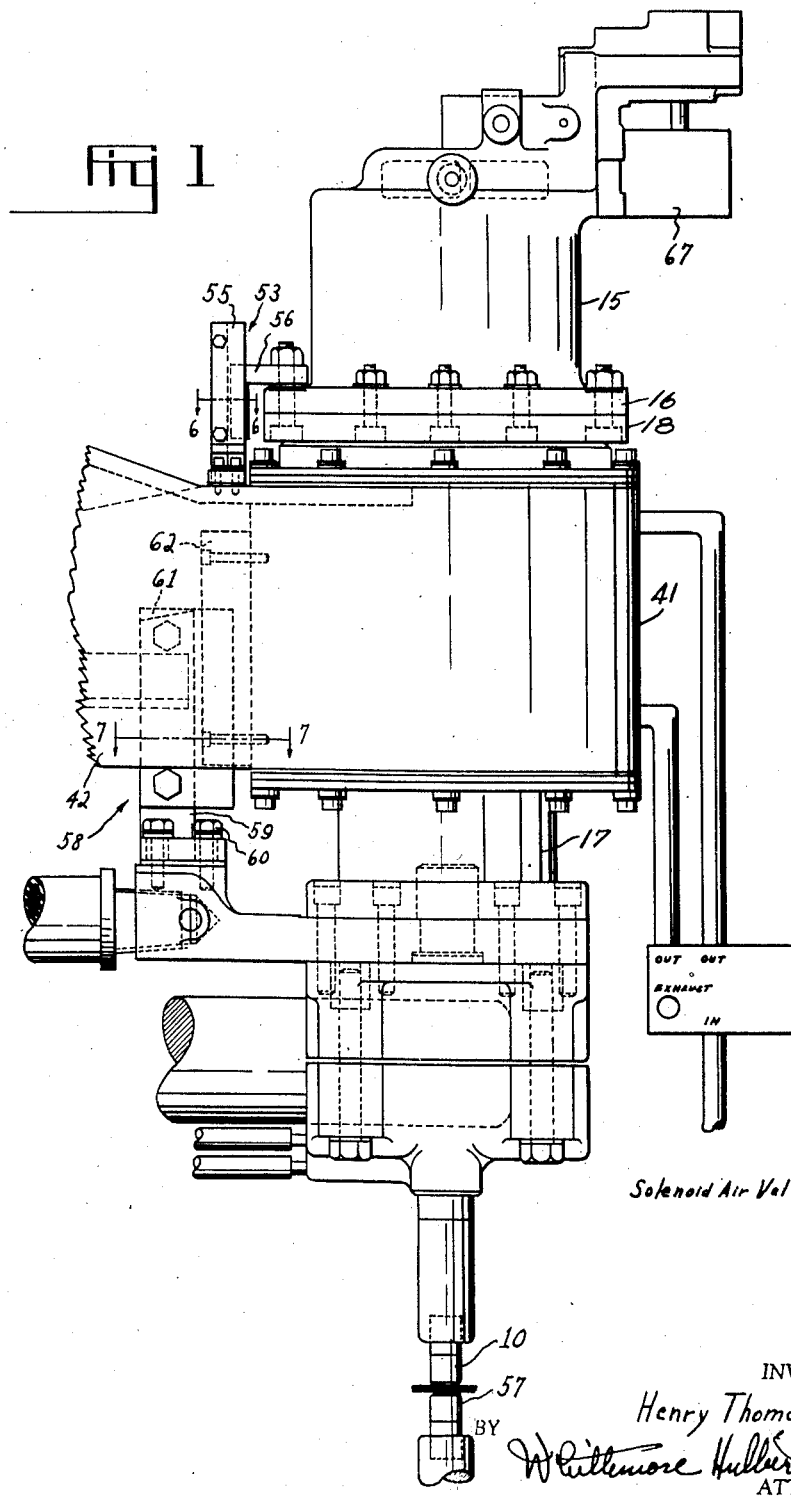

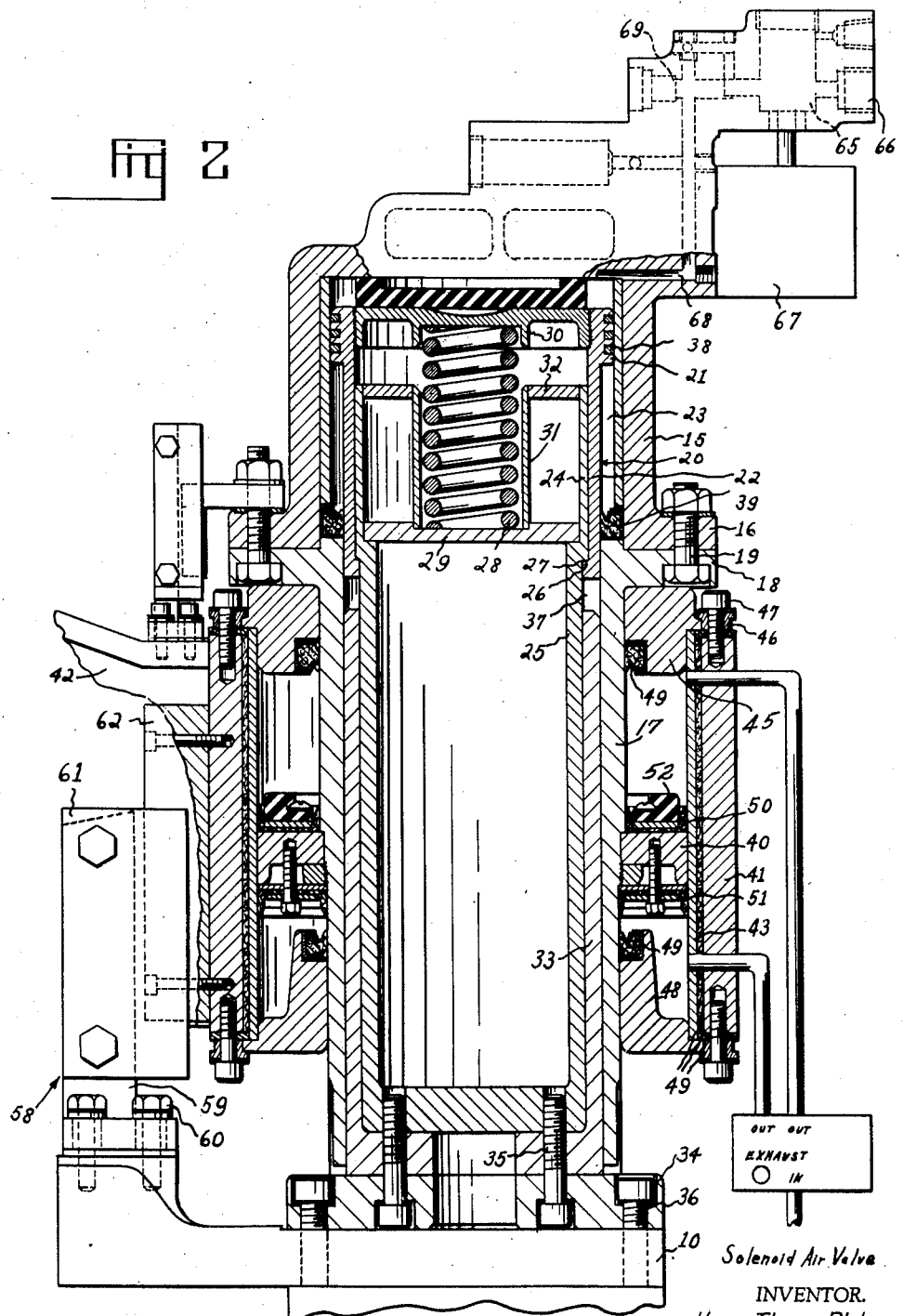

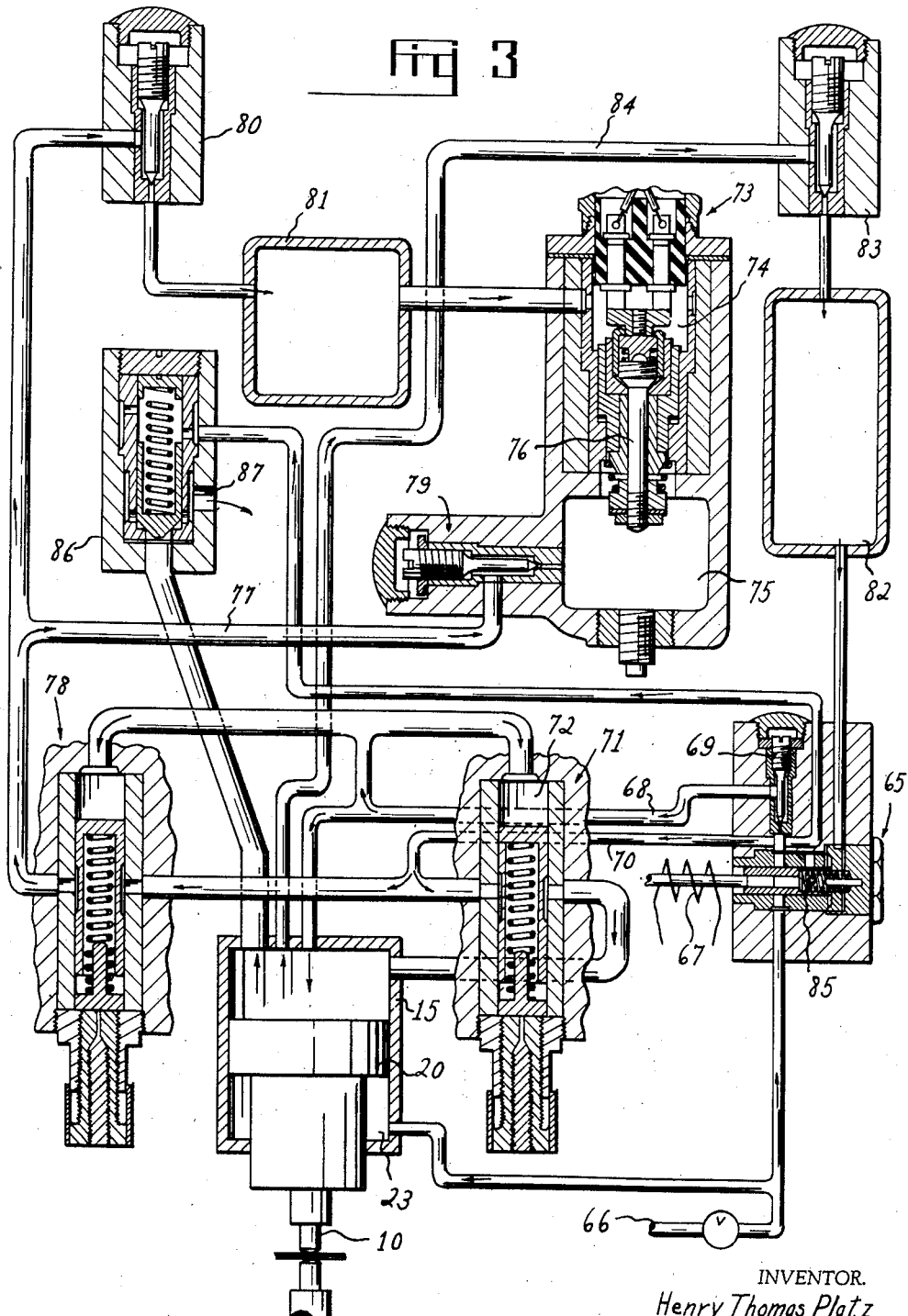

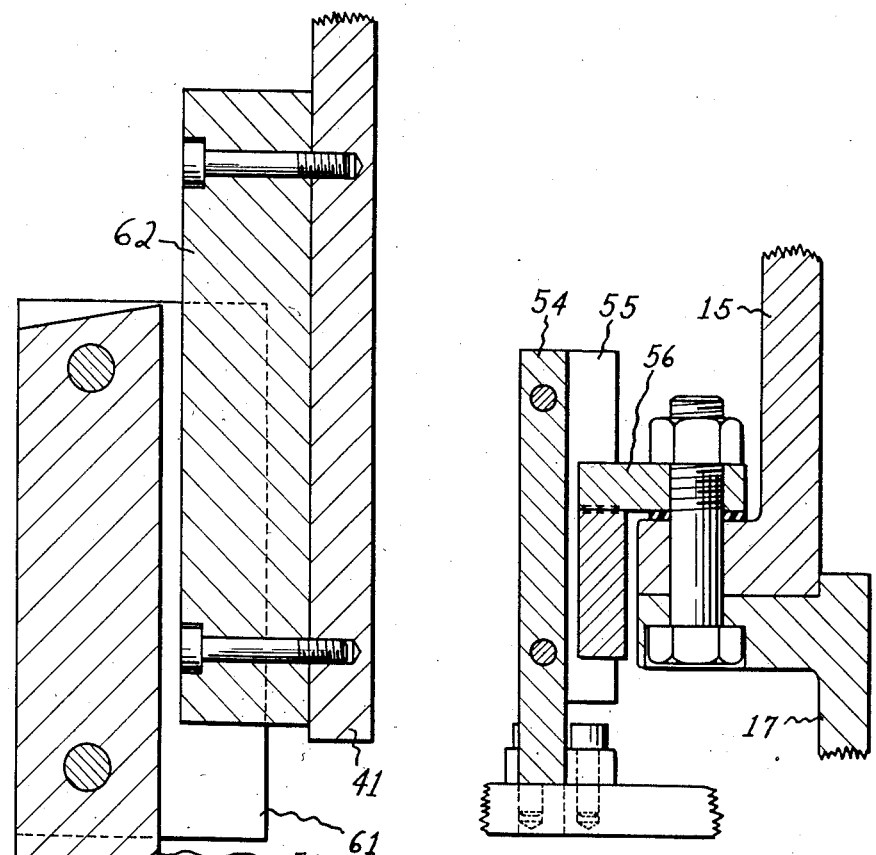

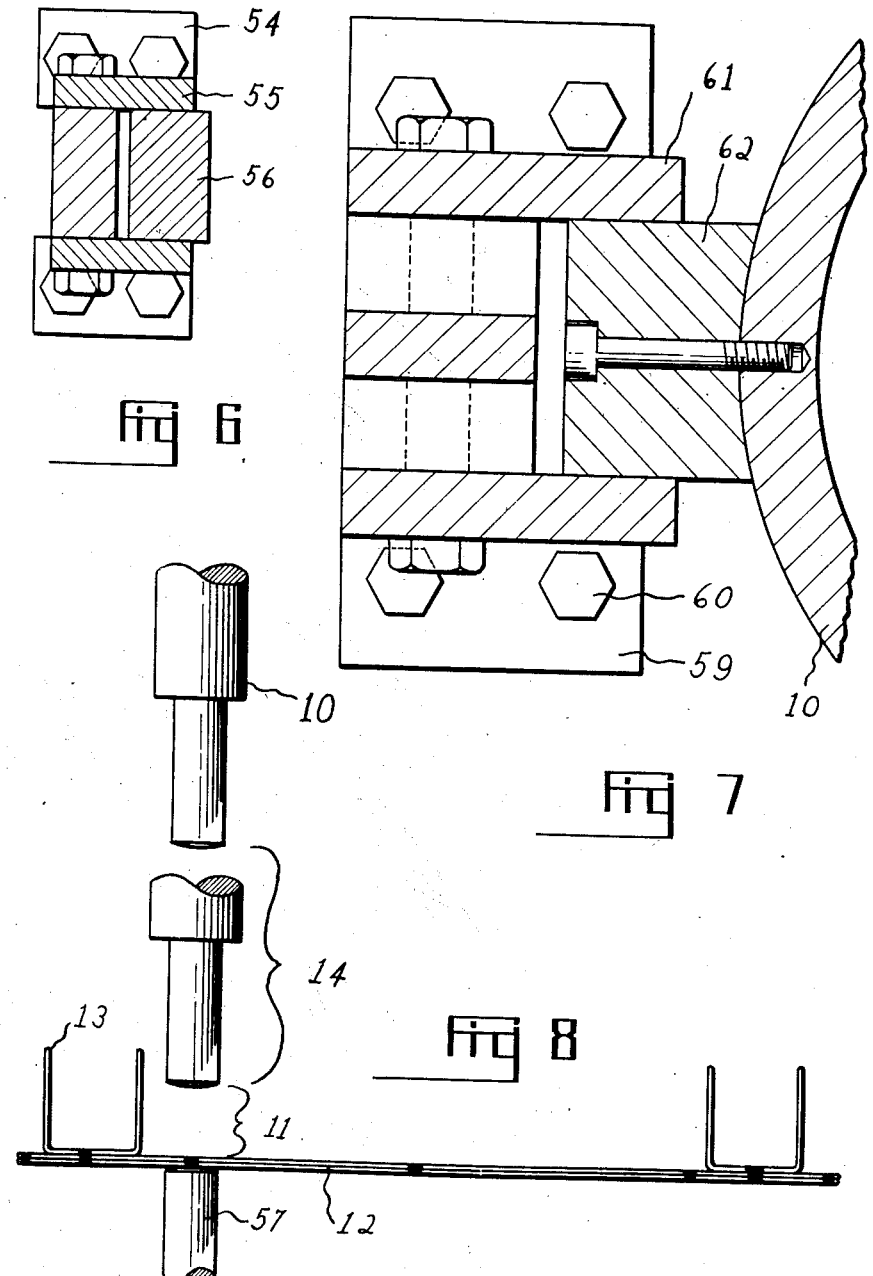

2,329,851

UNITED STATES PATENT OFFICE 2,329,851

WELDING APPARATUS

Henry Thomas Platz, Detroit, Mich., assignor to Briggs Manufacturing Company, Detroit, Mich., a corporation of Michigan Application March 30, 1942, Serial No. 436,871

10 Claims. (Cl. 219—4)

This invention relates generally to welding apparatus and refers more particularly to improvements in spot welding equipment.

One of the principal objects of this invention is to provide a welder having means in addition to the usual electrode operating means for selectively retracting the electrode to obtain a clearance between the work being welded and the electrode which is substantially greater than the clearance obtainable under normal condtions of operation.

The above feature renders it possible to appreciably increase the rate of production of welded plates having spaced raised portions or ribs of a height exceeding the normal electrode travel required for ordinary welding because it enables restricting the normal electrode travel to a minimum during successive ordinary welding operations and permits rapid raising of the electrode beyond its normal travel sufficiently to clear ribs or raised portions on the plates when such are encountered.

With the above, as well as other objects in view, this invention resides in the novel means provided for selectively raising the electrode beyond its normal restricted travel and this means together with other features of the invention will be made more apparent as this description proceeds, especially when considered in connection with the accompanying drawings, wherein:

Figure 1 is a fragmentary side elevational view of a welder embodying the features of this invention;

Figure 2 is a fragmentary vertical sectional view of the welder shown in Figure 1;

Figure 3 is a diagrammatic view showing the various controls for the welder;

Figure 4 is a detail sectional view of the vertical guide for the welder head;

Figure 5 is a detail sectional view of the vertical guide for the movable electrode;

Figure 6 is a cross sectional view taken on the line 6—6 of Figure 1;

Figure 7 is a cross sectional view taken on the line 7—7 of Figure 1; and

Figure 8 is a diagrammatic view showing the application of the welder to a typical work piece.

The welder selected for the purpose of illustrating the invention is a stationary spot welder having a vertically reciprocable electrode normally movable throughout a range of travel which is restricted to reduce lost motion between successive welds to a minimum. The movable electrode is designated in the drawings by the reference character 10 and the normal restricted travel of the electrode is designated in Figure 8 by the reference character 11. This restricted range of movement of the electrode 10 is sufficient to satisfactorily weld the work 12 but is less than the height of the rib 13 on the work. In order to enable the welding operations to be continued at the opposite side of the rib without seriously delaying these operations, I provide means for expediently retracting the electrode 10 throughout a distance 14 which is shown in Figure 8 as being sufficient to enable the rib 13 to be passed beneath the electrode 10.

With the above in mind reference will now be made more in detail to the particular construction of the welder and to the specific means provided herein for selectively moving the electrode 10 through the range of travel indicated by the reference character 14 in Figure 8. Upon reference to Figure 2 of the drawings it will be noted that the reference character 15 designates a vertically disposed cylinder closed at its upper end and having a radially outwardly extending attaching flange 16 at its lower end. The cylinder 15 is carried by a vertically slidable sleeve 17 concentrically arranged with respect to the axis of the cylinder and having a radially outwardly extending flange 18 at the upper end secured to the flange 16 by means of fastener elements 19.

A piston 20 is mounted in the cylinder 15 for reciprocation and is provided with a head 21 of sufficient diameter to slidably engage the inner wall of the cylinder 15. The head 21 is mounted on the upper end of a skirt 22 having an external diameter less than the internal diameter of the cylinder to provide an annular chamber 23 below the head 21. The lower end of the skirt 22 slidably engages the inner wall of the sleeve 17 and the inner wall of the skirt forms a bearing for the enlarged upper end 24 of a vertical plunger 25 which extends downwardly through the sleeve 17. The enlarged head 24 on the plunger 25 forms a radially outwardly extending shoulder 26 which engages a corresponding radially inwardly extending shoulder 27 formed on the lower end of the piston skirt 22.

The two shoulders are normally yieldably held in engagement with one another by means of a coil spring 28 having the upper end abutting the underside of the piston head 21 and having the lower end seated on a plate 29 carried by the head 24 of the plunger 25. The upper end of the coil spring is held against shifting movement relative to the piston by means of an annular flange 30 extending downwardly from the piston head and surrounding the upper end of the coil spring. The lower end portion of the coil spring is held in position relative to the plunger by means of an annular retainer 31 having its lower end secured to the plate 29 and having the upper end secured to the corresponding end of the plunger by a ring 32.

The spring 28 operatively connects the piston 20 to the plunger 25 and is of sufficient strength to move both of these elements as a unit under the action of the fluid pressure admitted to the upper end of the cylinder by the control mechanism to be more fully hereinafter described. The plunger 25 is guided in the sleeve 17 by means of a second sleeve 33 having the inner and outer surfaces respectively slidably engaging the outer and inner surfaces of the plunger 25 and sleeve 17. The lower ends of both the plunger 25 and sleeve 33 are secured to a plate 34 by means of bolts 35. The plate 34 is positioned below the lower end of the sleeve 17 and is detachably secured to the electrode 10 by means of bolts 36.

It follows from the above that downward movement of the piston 20 in the cylinder 15 imparts a corresponding movement to the plunger 25 and sleeve 33. Inasmuch as the electrode 10 is secured to the lower ends of the plunger 25 and sleeve 33, the electrode is also moved in a downward direction into engagement with the work 12 to be welded. As soon, however, as the electrode engages the work 12, the coil spring 28 is compressed and the piston 20 moves downwardly relative to the plunger 25 and sleeve 33. The extent of downward movement of the piston 20 relative to the plunger 25 and sleeve 33 depends upon the amount of clearance 37 provided between the lower end of the piston skirt 22 and the upper end of the sleeve 33. Engagement of the lower end of the piston skirt 22 with the upper end of the sleeve 33 establishes a positive connection between the piston 20 and the electrode 10 with the result that the electrode is subjected to the full line pressure. This phase of the operation is usually the period when the weld is forged and is important in obtaining strong commercially satisfactory welds.

Upon completion of the welding operation, the upper end of the cylinder 15 is ultimately exhausted and, in the present instance, the parts are returned to their restricted positions by a constant pressure which is maintained in the annular space 23 surrounding the piston skirt. It will, of course, be understood that the pressure in the annular space 23 acts on a much smaller area of the piston head 21 than the pressure which is introduced into the upper end of the cylinder and, therefore, does not interfere with the operation of the piston by the latter pressure. The escape of fluid under pressure from the chamber 23 is prevented by the cooperation of the sealing rings 38 and 39.

As pointed out above, the range of travel of the electrode 10 by the mechanism previously described is indicated in Figure 8 by the reference character 11 and this range of travel is the minimum required to obtain satisfactory welds. In other words, this normal degree of movement of the electrode 10 is predetermined to eliminate as much lost motion as possible between successive welds and this is desirable because it appreciably increases the rate of production.

As shown in Figure 8, however, there are instances where it is desirable to increase the range of travel of the electrode and this is accomplished by retracting the cylinder head 15, piston 20, plunger 25, sleeve 33 and electrode 10 to substantially increase the clearance between the lower end of the electrode 10 and the work 12. The above listed parts are selectively raised and returned to their normal positions by the sleeve 17. In detail, a double acting piston 40 is secured to the sleeve 17 intermediate its ends and is slidably supported in a cylinder 41.

The cylinder 41 is concentrically supported with respect to the sleeve 17 and is welded or otherwise permanently secured to a bracket 42 which is fixed in any suitable manner on the frame structure of the welder. Upon reference to Figure 2 it will be noted that the cylinder 41 is provided with a liner 43 engageable with the piston 40 to guide the latter and insulated from metallic contact with the cylinder 41 by means of the insulating material 44. As a result, any electrical current which may escape from the electrode is prevented from passing through the stationary supporting bracket.

The upper end of the cylinder 41 is closed by a bearing 45 having a sliding engagement with the outer surface of the sleeve 17 and having a radially outwardly extending attaching flange 46 which is secured to the upper end of the cylinder 41 by bolts 47. The lower end of the cylinder 41 is closed by a bearing 48 which slidably engages the outer surface of the sleeve 17 and is secured to the lower end of the cylinder 41 in the same manner as the bearing 45 is secured to the upper end of the cylinder. Both of the bearings cooperate to slidably support the sleeve 17 and fluid pressure is prevented from escaping past the bearings by means of suitable seals 49, respectively, carried by the bearings. In this connection it will be noted that fluid pressure is prevented from escaping in either direction past the piston by seals 50 and 51, respectively, secured to the top and bottom of the piston by suitable fastener elements. These seals are channel shaped in cross section and the opposite flanges thereof respectively slidably engage the adjacent walls of the cylinder liner 43 and the sleeve 17.

Any suitable means may be employed for alternately supplying fluid under pressure to and exhausting the same from opposite ends of the cylinder 41 to effect reciprocation of the piston 40. It will suffice to point out that when the various parts of the welder are in the relative positions thereof shown in Figure 2 and it is desired to retract the cylinder head 15 to provide increased clearance below the electrode 10, fluid under pressure is admitted to the cylinder 41 below the piston 40 and is exhausted from the space in the cylinder 41 above the piston 40. As a result, the piston 40 together with the sleeve 17 are moved upwardly until the bumper 52 on the upper end of the piston engages the bearing 45. The cylinder head 15 is rigidly connected to the upper end of the sleeve 17 and accordingly moves as a unit with the latter. The piston 20 is held against movement relative to the cylinder head by the action of the fluid under pressure in the chamber 23 and accordingly this piston together with the electrode 10 and associated parts moves upwardly with the cylinder. The parts are returned to their normal position shown in Figure 2 by exhausting the fluid pressure from the cylinder 41 below the piston 40 and by supplying fluid under pressure to the cylinder 41 above the piston 40. It may be pointed out in this connection that the force acting on the upper end of the piston 40 to retain the cylinder head and associated parts in their lowermost positions is sufficient to counteract any reactive force tending to raise the piston during normal operation of the welder.

The cylinder head 15 and associated parts are prevented from rotative movement by means of a vertical guide 53. The guide 53 comprises a bracket 54 secured to the supporting arm 42 adjacent the cylinder head 15 and having oppositely disposed side plates 55 which cooperate to form a vertical guide. A follower 56 is secured to the cylinder head 15 and slidably engages the inner surfaces of the guide plates 55. As a result, the guide 53 enables free vertical travel of the cylinder head 15 and, at the same time, prevents rotative movement of the head and associated parts.

It is also advantageous to prevent rocking movement of the electrode 10 relative to its cooperating fixed electrode 57. This is accomplished by a vertical guide 58 comprising a bracket 59 secured to the electrode supporting structure by means of bolts 60 and having side plates 61 forming a vertical track for receiving a vertical guide member 62. The guide member 62 is secured to the adjacent side of the cylinder 41 and is, accordingly, fixed with respect to the bracket 59. This construction permits the required retracting movement of the electrode but prevents oscillation of the electrode.

In the present instance, the cylinder head 15 is in the form of a casting fashioned to provide a housing for all of the various instrumentalities employed in the control means for both the welding circuit and electrode operating piston 20. These instrumentalities are shown in Figure 3 of the drawings and operate to perform their respective functions in substantially the same manner described in detail in the Platz copending application, Serial No. 363,936, filed November 1, 1940.

Briefly, the control mechanism comprises a plunger type valve 65 supported between the fluid pressure supply line 66 and the upper end of the cylinder 15. The valve 65 is movable to its open position by a solenoid 67 which, in turn, is energized by a suitable switch (not shown) conveniently located for manipulation by the operator. Movement of the valve 65 to its open position shown in Figure 3 establishes communication between the fluid pressure supply line 66 and the upper end of the cylinder 15 through the medium of a passage 68 and a metering valve 69. The metering valve controls the rate of pressure rise in the cylinder 15 above the piston 20 and renders it possible to vary the rate of travel of the piston 20 in a downward direction to engage the electrode 10 with the work.

It will also be noted from Figure 3 that a second passage 70 establishes communication between the upper end of the cylinder 15 and the discharge side of the valve 65 in advance of the metering valve 69. As a result, fluid under the full line pressure is admitted to the passage 70. The flow of fluid under pressure from the passage 70 into the cylinder 15 is controlled by a normally closed plunger valve 71 having the upper end communicating with the passage 68 and normally held closed against the pressure in the passage 68 by a spring 72. Under normal conditions of operation, the spring 72 is adjusted to maintain the passage 70 closed until the electrode 10 has been moved by the piston 20 into engagement with the work and, in some instances, opening of the valve 71 is delayed until after the welding operation. In cases of this character the full line pressure admitted to the cylinder through the passage 70 is employed to forge the work subsequent to the welding operation.

The support to the electrodes is controlled by a fluid pressure operated switch 73 having spaced chambers 74 and 75 and having a contact carrying plunger 76 reciprocably mounted between the chambers. The switch 73 is closed in response to fluid under pressure built up in the chamber 75 and accordingly the latter communicates with the passage 70 through the medium of a passage 77. The passage 77 is controlled by a plunger type valve 78 similar to the valve 71 and is also operated by fluid under pressure from the supply passage 68. However, the valve 78 is adjusted to open as soon as the electrode 10 properly engages the work and serves to supply fluid under pressure to the switch closing chamber 75 independently of the valve 71. The flow of fluid under pressure into the chamber 75 is regulated by a metering valve 79 which is adjustable to cooperate with the valve 78 to effect closing of the welding circuit at the proper time.

It will also be noted from Figure 3 that fluid pressure from the discharge side of the valve 78 is supplied to the switch opening chamber 74 through a metering valve 80 and an accumulating chamber 81. The metering valve 80 regulates the rate of pressure rise in the accumulating chamber 81 and the latter communicates directly with the switch opening chamber 74 to effect operation of the switch 73 to open the welding circuit in proper timed relation to closing of this circuit. It may be pointed out that the area of the switch operating plunger 76 exposed to the interior of the chamber 74 exceeds the area of the plunger exposed to the switch closing chamber 75 and this differential is sufficient to enable opening of the switch against the pressure in the chamber 75.

The valve 65 is returned to its closed position by fluid under pressure supplied by an accumulating chamber 82. This chamber communicates with the upper end of the cylinder 15 through the medium of a metering valve 83 and a passage 84. The metering valve 83 controls the flow of fluid under pressure into the accumulating chamber 82 and is adjusted to delay closing of the valve 65 until the welding cycle is completed. The valve construction is such that the end of the valve exposed to the fluid under pressure from the accumulating chamber 82 is of greater area than the area of the valve acted upon by the fluid under pressure flowing through the supply line 66 and this differential area is such as to enable closing of the valve 65 when the required pressure is reached in the accumulating chamber 82. It may also be pointed out at this time that movement of the valve 65 to its closed position opens an exhaust port 85 and enables the system to exhaust. In the present instance, exhaust of the system is facilitated by a valve 86 and by the exhaust port 87 which is opened as soon as the valve 65 is closed.

All of the above parts of the control system are compactly supported in the cylinder head 15 and are retractible as a unit with the head 15 upon movement of the retracting piston 40 in an upward direction relative to the fixed cylinder 41. As a result, the number of flexible conduits or connections required are reduced to the minimum and the adjustable instrumentalities of the control system are rendered easily accessible.

What I claim as my invention is:

1. A welder having a head provided with a cylinder, a piston in said cylinder normally held in a retracted position adjacent one end of the cylinder and movable by fluid under pressure in a direction toward the other end of the cylinder, an electrode connected to the piston for movement thereby into engagement with the work to be welded, a second piston concentric with the axis of the first piston and connected to said head, and means operable in the retracted position of the first piston and electrode to move the second piston in a direction to displace the head together with the first piston and electrode in a direction to increase the clearance between the work and electrode.

2. A welder having a head provided with a cylinder and having an electrode, a piston reciprocably mounted in the cylinder and connected to the electrode for moving the latter into and out of engagement with the work to be welded, means for normally maintaining the piston and electrode in their retracted positions, means for periodically moving the piston against the action of the last named means to move the electrode into contact with the work, a second cylinder concentrically arranged with respect to the axis of the first cylinder, a piston reciprocably mounted in the second cylinder and secured to the head, and means selectively operable in the retracted position of the first piston and electrode to move the second piston in a direction to raise the head together with the first piston and electrode to increase the clearance between the electrode and work.

3. A welder having an electrode and a vertically movable head provided with a cylinder, a piston reciprocably mounted in the cylinder and normally maintained in its uppermost position in the cylinder, a connection between the piston and electrode for moving the latter into and out of contact with the work to be welded upon movement of the piston toward and away from the lower end of the cylinder, a vertically reciprocable sleeve secured at its upper end to the head, a bracket slidably supporting the sleeve and having a portion coacting with the sleeve to form a cylinder, and a piston reciprocably mounted in the second cylinder and secured to the sleeve for raising and lowering said head.

4. A welder having an electrode and a vertically movable head provided with a cylinder, a piston reciprocably mounted in the cylinder and normally maintained in its uppermost position in the cylinder, a connection between the piston and electrode for moving the latter into and out of contact with the work to be welded upon movement of the piston toward and away from the lower end of the cylinder, a vertically reciprocable sleeve secured at its upper end to the head, a bracket having vertically spaced bearing portions slidably engaging the sleeve to support the latter and having a portion between the bearing portions cooperating with the sleeve to form a cylinder, a piston reciprocably mounted in the second cylinder and secured to the sleeve for raising and lowering the head, and cooperating slidably engaging means on the bracket and head to prevent rotative movement of the head.

5. A welder having electrode supporting means and having a vertically movable head provided with a cylinder, a piston reciprocably mounted in the cylinder and normally urged to its uppermost position in the cylinder, a connection between the piston and electrode for moving the latter into and out of contact with the work to be welded upon movement of the piston toward and away from the lower end of the cylinder, a vertically reciprocable sleeve secured at its upper end to the head, a bracket slidably supporting the sleeve and having an annular portion cooperating with the sleeve to form a cylinder, a piston reciprocably mounted in the second cylinder and secured to the sleeve for raising and lowering the head, and selectively operable means for alternately introducing fluid under pressure into and for exhausting fluid under pressure from the second cylinder at opposite sides of the piston therein.

6. A welder having electrode supporting means and having a vertically movable head provided with a cylinder, a piston reciprocably mounted in the cylinder and normally urged to its uppermost position in the cylinder, a connection between the piston and electrode for moving the latter into and out of contact with the work to be welded upon movement of the piston toward and away from the lower end of the cylinder, a vertically reciprocable sleeve secured at its upper end to the head, a bracket slidably supporting the sleeve and having an annular portion cooperating with the sleeve to form a cylinder, a piston reciprocably mounted in the second cylinder and secured to the sleeve for raising and lowering the head, cooperating slidably engaging means on the bracket and head preventing rotative movement of the head relative to the bracket, and cooperating slidably engaging means on the bracket and electrode supporting means to hold the latter from rotative movement relative to the bracket.

7. A welder having a vertically movable cylinder and having electrode supporting means spaced below the cylinder, a piston reciprocably mounted in the cylinder and normally maintained in its uppermost position in the cylinder, a bracket having an annular portion located between the cylinder and electrode supporting means in concentric relation to the axis of the cylinder, a sleeve slidably supported in the annular portion of the bracket and secured at its upper end to the cylinder, means extending through the sleeve for connecting the piston to the electrode supporting means, and means for selectively raising the sleeve to lift the cylinder together with the piston and electrode supporting means relative to the work.

8. A welder having a vertically movable cylinder and having electrode supporting means spaced below the cylinder, a piston reciprocably mounted in the cylinder and normally maintained in its uppermost position in the cylinder, a bracket having an annular portion located between the cylinder and electrode supporting means in concentric relation to the axis of the cylinder, a sleeve secured at its upper end to the cylinder and slidably supported in the annular portion of the bracket in spaced relation thereto, means slidably supported in the sleeve and operable to connect the piston to the electrode supporting means, and a piston reciprocably mounted in the space between the annular portion of the bracket and sleeve and secured to the latter for raising and lowering the cylinder, associated piston and electrode supporting means.

9. A welder having a vertically movable cylinder and having electrode supporting means spaced below the cylinder, a piston reciprocably mounted in the cylinder and normally maintained in its uppermost position in the cylinder, a bracket having an annular portion located between the cylinder and electrode supporting means in concentric relation to the axis of the cylinder, a sleeve slidably supported in the annular portion of the bracket and secured at its upper end to the cylinder, means slidably supported in the sleeve and operatively connecting the piston to the electrode supporting means, means for selectively operating the sleeve to raise and lower the cylinder, associated piston and electrode supporting means, and means on said bracket and respectively slidably engaging the cylinder and electrode supporting means to hold both the latter elements from rotative movement relative to the bracket.

10. A welder having a vertically movable cylinder and having electrode supporting means spaced below the cylinder, a piston reciprocably mounted in the cylinder and normally maintained in its uppermost position in the cylinder, a bracket having an annular portion located between the cylinder and electrode supporting means in concentric relation to the axis of the cylinder, a sleeve slidably supported in the annular portion of the bracket and secured at its upper end to the cylinder, a plunger extending through the sleeve and having its lower end secured to the electrode supporting means, a yielding connection between the upper end of the plunger and piston, a second sleeve telescopically engaging the plunger and slidably supported by the first sleeve, said second sleeve having the lower end secured to the electrode supporting means and having the upper end positioned to engage the plunger to form a positive connection between the piston and electrode supporting means, and selectively operable means for raising the first sleeve to lift the cylinder, associated piston and electrode supporting means relative to the work.

HENRY THOMAS PLATZ.